United States Patent [19]
Hepworth et al.

[11] Patent Number: 5,341,590
[45] Date of Patent: Aug. 30, 1994

[54] CARRYING CASE FOR FLY FISHING ROD AND REEL

[76] Inventors: Allen Hepworth; Gordon Smith, both of Port Moody; Walter Johb, Surrey, all of Canada

[21] Appl. No.: 977,115

[22] Filed: Nov. 16, 1992

[51] Int. Cl.$^5$ .............................................. A01K 97/08
[52] U.S. Cl. ........................................ 43/26; 43/54.1; 206/315.11
[58] Field of Search .................. 43/26, 25, 25.2, 54.1, 43/57.1; 206/315.11; 224/922

[56] References Cited
U.S. PATENT DOCUMENTS

| | | | |
|---|---|---|---|
| 3,641,697 | 2/1972 | Heidtman | 43/54.1 |
| 3,662,933 | 5/1972 | Michal | 43/26 |
| 3,674,190 | 7/1972 | Wright | 43/26 |
| 3,678,611 | 7/1972 | Files | 43/26 |
| 4,073,085 | 2/1978 | Stremeckus | 43/54.1 |
| 4,707,892 | 11/1987 | Nelson | 43/25.2 |
| 5,046,279 | 9/1991 | Smith | 43/26 |

FOREIGN PATENT DOCUMENTS

| | | | |
|---|---|---|---|
| 0497518 | 11/1953 | Canada | 43/26 |
| 2224916 | 5/1990 | United Kingdom | 43/26 |

*Primary Examiner*—Richard K. Seidel
*Assistant Examiner*—James Miner

[57] ABSTRACT

This invention provides a rigid, floating, carrying case for a fly fishing reel mounted on a fly fishing rod. The case has a tubular main body and features a hinged, end door for access to the rod and reel. The door can be closed to render airtight the end of the case. The case will then float indefinitely, with the airtight end bobbing visibly out of the water. The end door contains a small fly tackle compartment. A set of plastic rod clips, each rod clip comprising a plurality of branched clips of varied diameters, enables sections of a fly fishing rod to be clipped together alongside each other to fit into the case.

11 Claims, 2 Drawing Sheets

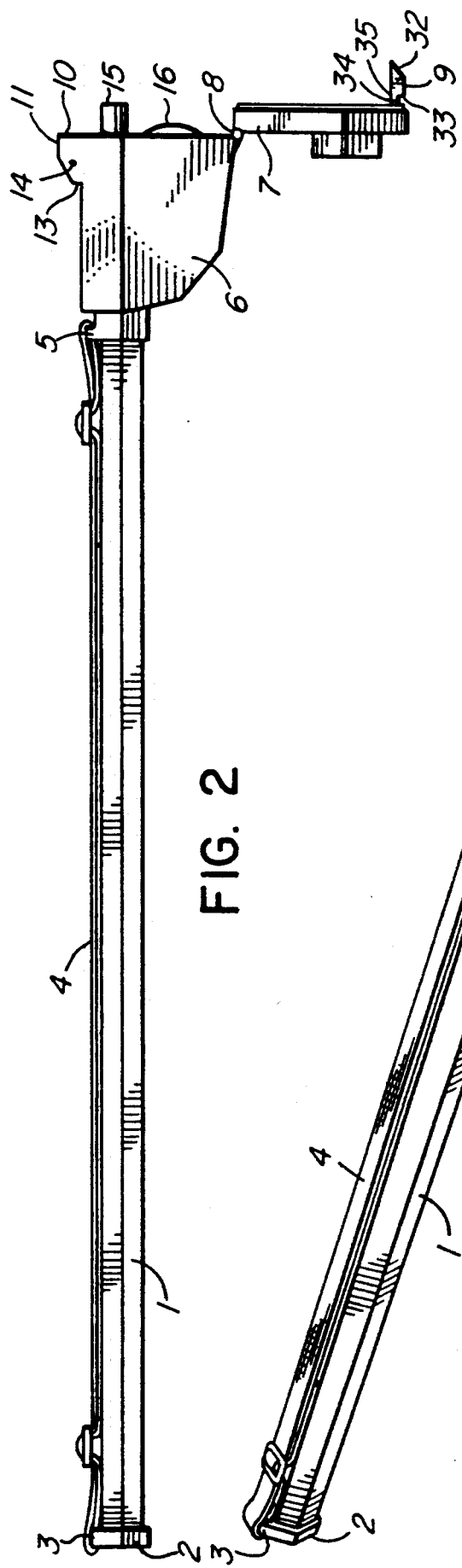
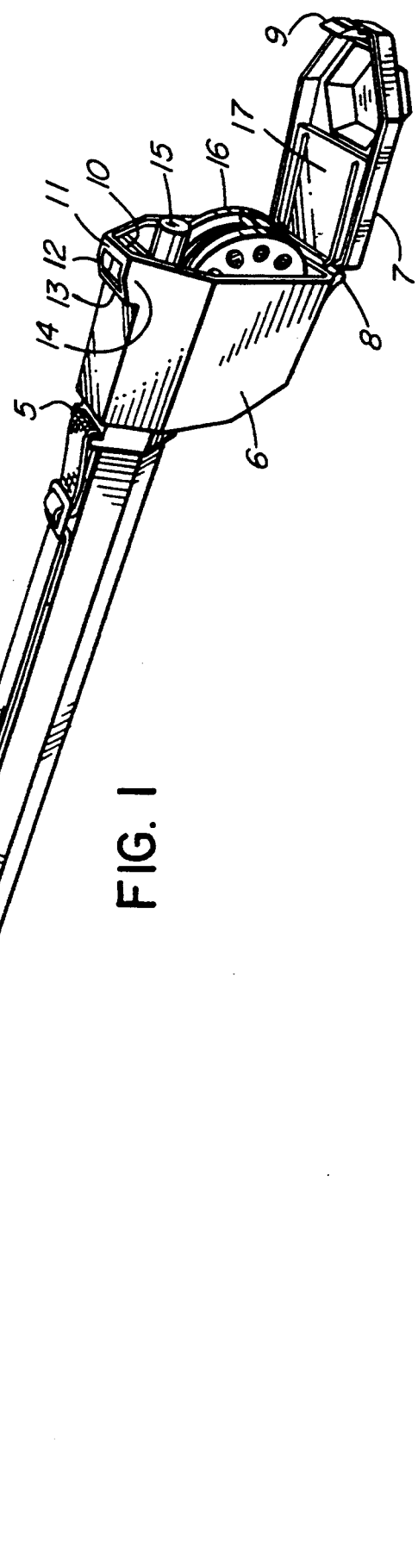

CARRYING CASE FOR FLY FISHING ROD AND REEL

FIELD OF THE INVENTION

This invention relates to carrying cases for containing a fishing rod, with a fishing reel mounted on the base portion of the rod.

DESCRIPTION OF THE PRIOR TECHNOLOGY

Typically such cases are simply made of soft material stitched together with a handle for ease of carrying. An example of this type of bag is shown in U.S. Pat. No. 4,726,141. A soft bag that encloses just the reel and the portion of the rod where the reel is mounted is shown in U.S. Pat. No. 4,136,478. A soft bag that additionally holds a portion of the tip section of a rod is shown in U.S. Pat. No. 4,641,454. U.S. Pat. No. 4,222,193 shows a fishing rod case in which a shrinkable tube encloses the entire rod. A plastic rod and reel case having two severable tubes for enclosing the rod and reel that interlock at an enlarged portion of each tube around the reel. A rigid case having a hinge down its length is shown in U.S. Pat. No. 3,641,697.

None of the prior technology discloses the features of the present invention.

SUMMARY OF THE PRESENT INVENTION

This invention provides a rigid, floating, carrying case for a fly fishing reel mounted on a fly fishing rod. The case has a tubular main body with one airtight end and with an opposite end featuring a hinged end door for access to the rod and reel. It the case is dropped into a body of water, water will leak past the hinged end door, causing the airtight end to rise above the water. The case will then float indefinitely, with the airtight end bobbing visibly out of the water. The end door contains a small fly tackle compartment. A set of plastic clips, each branching into rod clips of different diameters, enables sections of a fly fishing rod to be clipped together alongside each other to fit into the case.

DESCRIPTION OF THE DRAWINGS

FIG. 1 is a perspective drawing showing a preferred embodiment of this invention, in which the hinged end door is in an opened position.

FIG. 2 is a side view of the device of FIG. 1, in which the hinged end door is in a fully opened position.

DETAILED DESCRIPTION

Figure 3:
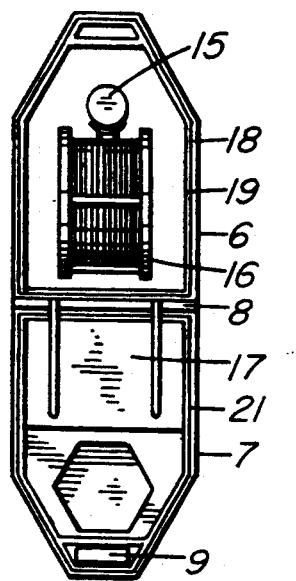
FIG. 3 is an end view of the device of FIG. 1, in which the hinged end door is in a fully opened position.

Referring to FIG. 1, the tubular main body 1 can be made out of hexagonal PVC tubing. The end cap 2 can be readily molded out of ABS plastic and is sealed with a super-glue to the main body 1. A first strap bridge 3 on the end cap 2 forms a slot through which a carrying strap 4 is attached. A second strap bridge 5 on the reel compartment 6 provides a second slot through which another end of the strap 4 can be attached. The end door 7 is attached by a hinge 8 to the reel compartment body. The end door 7 has a snap tab 9 that fits into an interlocking snap slot formed on the top edge 10 of the reel compartment body 6 by the snap bridge 11. Sides 12, 13, and 14 form a cavity to receive the snap tab 9. The reel compartment body 7 and end door can also be readily molded of ABS plastic.

Referring to FIG. 2, the end door 7 is fully open. The tab 9 has a curved leading face 32 to guide the tab into the interlocking snap slot formed by the top edge 10 and the snap bridge 11 when the door is closed. The locking face 33 snaps into a closed, locked position behind the snap bridge 11 and the locking neck 34 snaps into a closed locked position below snap bridge 11 when the end door 7 is fully closed. The neck 34 of the snap tab 9 flexes to allow the tab to snap into place. The user can press in the cavity formed by sides 12, 13 and 14 onto the curved leading face 32 of the snap tab 9 to release it and thereby end door 7 from the snap bridge 11 to open the end door 7 and take out the rod 15 and reel 16.

Referring to FIG. 3, the reel compartment body 6 and the end door 7 have edge surfaces comprising complementary ledges and ridges in order to have the reel compartment body 6 and the end door 7 fit snugly together. The reel compartment body 6 has an outer ridge 18 and inner ledge 19 that fit a complementary structure on the end door 7 of an outer ledge 20 and inner ridge 21. This arrangement keeps the end door 7 firmly in position when closed on the reel compartment body 6. The inner tackle compartment door 17 is also attached by the hinge 8 to the end door 7 and the reel compartment body 6. The hinge 8 can be a pin and collar hinge, or it could be a flexible plastic pivot joint.

Figure 4:
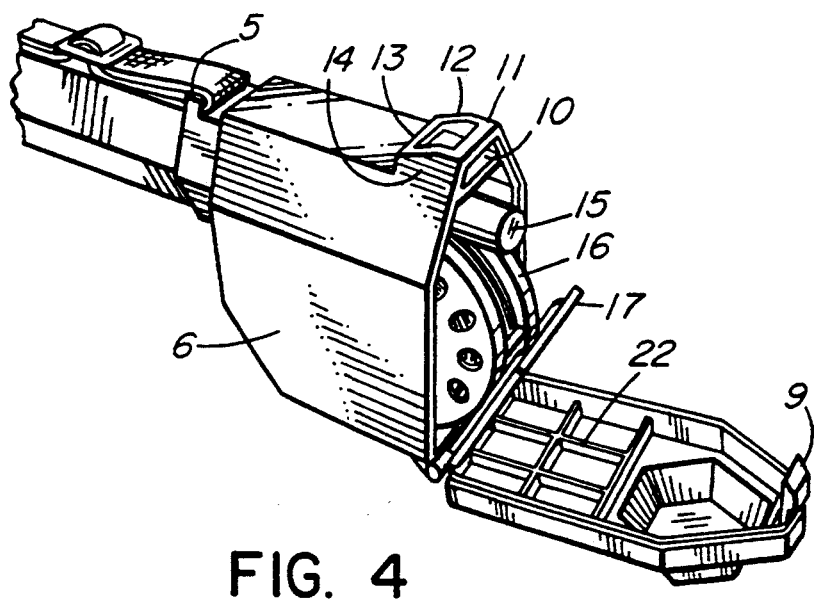
FIG. 4 is a perspective drawing of the device of FIG. 1, in which an inner door to the small fly tackle compartment is open.

Referring to FIG. 4, the inner tackle compartment door 17 can be opened to reveal the separate inner tackle compartments formed by dividing members such as at 22.

Figure 5:
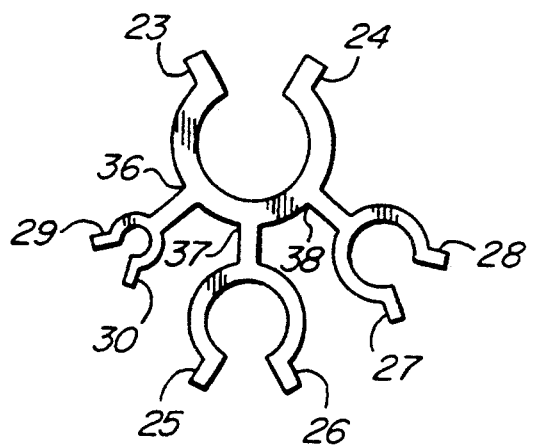
FIG. 5 is a perspective drawing of a set of plastic clips holding sections of a fishing rod together.

Referring to FIG. 5, the sections of a rod can be held within the case without the sections bumping into each other as the case is carried, by means of a set of rod clips, each rod clip comprising a plurality of branched clips of varied diameters. The large clip formed by branches 23 and 24 would snap onto a large circumference of the base rod section near its reel. Branching out from the large clip at 36, 37 and 38 respectively are a tiny clip, a small clip, and a medium clip. The tiny clip that is formed by branches 29 and 30 would snap onto a tiny circumference of the top rod section near its tip. Likewise another such rod clip would join two sections of the rod by means of the medium clip formed by branches 25 and 26 being snapped onto a medium circumference of the base rod section near its end opposite the reel end, and the small clip formed by branches 27 and 28 being snapped onto the small circumference of the top rod section near its end opposite the tip of the rod.

Figure 6:
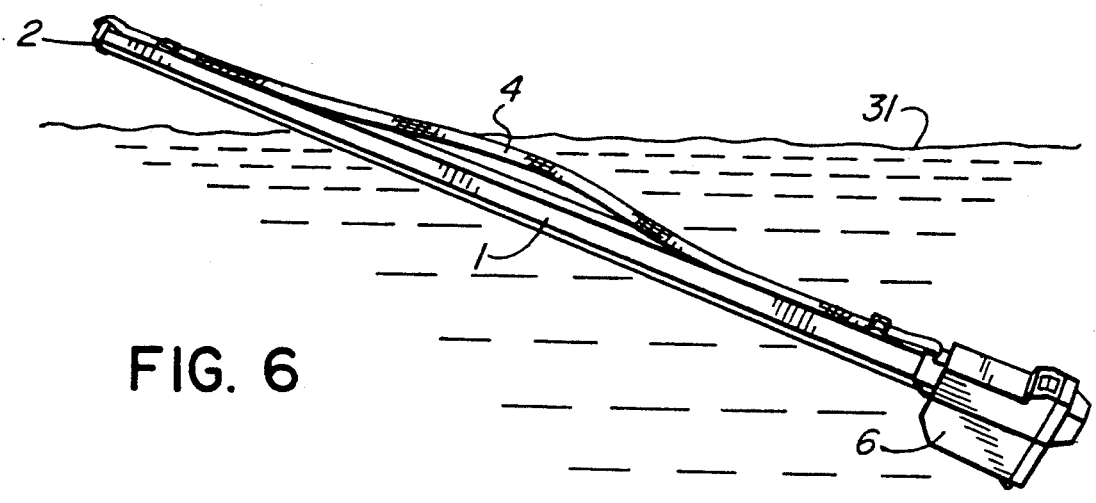
FIG. 6 is a cross-section of the device of FIG. 1 floating in water.

Referring to FIG. 6, the reel compartment body 6 is not water-tight, and will gradually submerge if the case is dropped in the water 31. The main body 1 will then angle out of the water 31, with the end cap 2 visible above the water 31. Bright colours used on any or all of the end cap 2, the strap 4, and the main body 1, would help in making the case visible in or out of water. The device as a whole will float indefinitely due to the seal between the end cap 2 and the main body and the air trapped inside the device.

The case can be padded on its inside with closed cell polypropylene to keep the rod and reel from movement or damage within the case. A nylon woven strap provides a durable and water-tolerant means of carrying the case. The case can be made in various lengths simply by using different lengths of tube for the main body of the case. The end door can be hinged to any of the end edges of the reel compartment body. The snap tab and its complementary snap bridge can alternatively be placed on the reel compartment and the end door respectively.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A floating, rigid, carrying case for a fly fishing rod and mounted reel, comprising:
   a) a tubular main body for containing a fly fishing rod;
   b) an end cap sealed onto a first end of the tubular main body;
   c) a reel compartment body for containing a portion of the rod to which the reel is mounted and for containing the reel, affixed to a second end of the tubular main body;
   d) an end door attached by a hinge joint to the reel compartment for giving access to withdraw and insert the rod and reel from and into the case, the end door containing an inner door to an inner tackle compartment within the end door;
   e) a snap tab that fits under a snap bridge to releasably hold the end door in a closed position on the reel compartment.

2. The case of claim 1, in which the inner door is hinged with the end door to the reel compartment body.

3. The case of claim 1, in which the snap tab has a curved leading face to guide the tab into an interlocking snap slot formed by the snap bridge.

4. The case of claim 1, in which the snap bridge in conjunction with at least two side members forms a cavity in which the curved leading face is exposed in a locked position of the tab in order to allow an application of pressure to the leading face to unlock the snap tab.

5. The case of claim 1, in which the snap tab has a locking face that snaps into a locked position behind the snap bridge.

6. The case of claim 1, in which the snap tab has a flexible locking neck that snaps into a locked position below the snap bridge.

7. The case of claim 1, in which the reel compartment body and the end door have edge surfaces comprising complementary ledges and ridges in order to have the reel compartment body and the end door fit snugly together.

8. The case of claim 1, in which the reel compartment body and the end door when closed form a joint that is not water-tight, in order to allow the reel compartment body to gradually submerge when the case is dropped in water, thereby enabling the case to float with the the end cap and a portion of the tubular main body adjacent to the end cap protruding above the water.

9. The case of claim 1, in which the end cap comprises a first strap bridge around which an end of a carrying strap is attached, and in which the reel compartment body comprises a second strap bridge through which another end of the carrying strap is attached.

10. The case of claim 1, additionally comprising at least one rod clip that forms a plurality of rod-gripping clips of varied diameters in order to clip one section of the fishing rod to another within the case.

11. The case of claim 2, in which:
   a) the snap tab has a curved leading face to guide the tab into an interlocking snap slot formed by the snap bridge;
   b) the snap bridge in conjunction with at least two side members forms a cavity in which the curved leading face is exposed in a locked position of the tab in order to allow an application of pressure to the leading face to unlock the snap tab;
   c) the snap tab has a locking face that snaps into a locked position behind the snap bridge, and has a has a flexible locking neck that snaps into a locked position below the snap bridge;
   d) the reel compartment body and the end door have edge surfaces comprising complementary ledges and ridges in order to have the reel compartment body and the end door fit snugly together;
   e) the inner tackle compartment comprising at least one divider member;
   f) the reel compartment body and the end door when closed form a joint that is not water-tight, in order to allow the reel compartment body to gradually submerge when the case is dropped in water, thereby enabling the case to float with the the end cap and a portion of the tubular main body adjacent to the end cap protruding above the water;
   g) the end cap comprises a first strap bridge around which an end of a carrying strap is attached, and in which the reel compartment body comprises a second strap bridge through which another end of the carrying strap is attached;
   h) the case has some padding means on the inside of the case for reducing movement of the rod and reel within the case.

* * * * *